United States Patent
Kostenbader et al.

(10) Patent No.: US 10,744,613 B2
(45) Date of Patent: Aug. 18, 2020

(54) DEVICE FOR MACHINING AND/OR COATING A WORKPIECE

(71) Applicant: HOMAG GmbH, Schopfloch (DE)

(72) Inventors: Markus Kostenbader, Bondorf (DE); Wolfgang Knorr, Hirrlingen (DE)

(73) Assignee: HOMAG GmbH, Schopfloch (DE)

( * ) Notice: Subject to any disclaimer, the term of this patent is extended or adjusted under 35 U.S.C. 154(b) by 36 days.

(21) Appl. No.: 16/080,965

(22) PCT Filed: Mar. 15, 2017

(86) PCT No.: PCT/EP2017/056088
§ 371 (c)(1),
(2) Date: Aug. 29, 2018

(87) PCT Pub. No.: WO2017/158001
PCT Pub. Date: Sep. 21, 2017

(65) Prior Publication Data
US 2019/0061087 A1 Feb. 28, 2019

(30) Foreign Application Priority Data
Mar. 15, 2016 (DE) .................. 10 2016 204 249

(51) Int. Cl.
*G05B 19/18* (2006.01)
*B23Q 17/20* (2006.01)
(Continued)

(52) U.S. Cl.
CPC .............. *B23Q 17/20* (2013.01); *B05D 7/06* (2013.01); *B23Q 7/00* (2013.01); *B23Q 17/24* (2013.01);
(Continued)

(58) Field of Classification Search
CPC .................................................. G05B 19/408
(Continued)

(56) References Cited

U.S. PATENT DOCUMENTS 5,672,207 A * 9/1997 Oechler .............. B05B 13/0221
118/238
2004/0040168 A1* 3/2004 Nagatsuka ............. B23Q 17/20
33/549
(Continued)

FOREIGN PATENT DOCUMENTS

DE 19741163 A1 4/1999
DE 19741163 C2 * 10/2002 ....... G05B 19/41815
(Continued)

*Primary Examiner* — Suresh Suryawanshi
(74) *Attorney, Agent, or Firm* — Morgan, Lewis & Bockius LLP

(57) ABSTRACT

The invention relates to a device (1) for machining a workpiece (2) which preferably consist at least in sections of wood, wood material or synthetic material and/or for coating the workpiece (2) with a coating material (4), comprising: a machining device (30, 40) for machining the workpiece (2), and a conveyor (20) for affecting a relative movement between the workpiece (2) and the machining device (30, 40), a controller for controlling the conveyor (20) and the machining device (30, 40), characterized in that the device (1) further has at least one workpiece measuring device (22) which is configured to measure at least one property of the workpiece (2), in particular a property of a surface (2') of the workpiece (2) to be machined or to be coated.

11 Claims, 2 Drawing Sheets

(51) Int. Cl.
*B29C 63/00* (2006.01)
*B27D 5/00* (2006.01)
*B05D 7/06* (2006.01)
*B23Q 7/00* (2006.01)
*B23Q 17/24* (2006.01)
*B27C 9/00* (2006.01)
*B27M 1/08* (2006.01)
*G01B 17/02* (2006.01)
*B29C 65/00* (2006.01)
*B29K 711/14* (2006.01)
*B29C 65/48* (2006.01)
*B29C 65/14* (2006.01)
*B29C 65/10* (2006.01)
*B29C 65/16* (2006.01)
*B29C 65/08* (2006.01)
*B29C 63/48* (2006.01)

(52) U.S. Cl.
CPC ............ *B27C 9/00* (2013.01); *B27D 5/003* (2013.01); *B27M 1/08* (2013.01); *B29C 63/0026* (2013.01); *B29C 63/0065* (2013.01); *G01B 17/025* (2013.01); *B05D 2203/20* (2013.01); *B29C 65/08* (2013.01); *B29C 65/10* (2013.01); *B29C 65/1412* (2013.01); *B29C 65/1425* (2013.01); *B29C 65/16* (2013.01); *B29C 65/4815* (2013.01); *B29C 66/112* (2013.01); *B29C 66/114* (2013.01); *B29C 66/472* (2013.01); *B29C 66/4722* (2013.01); *B29C 66/836* (2013.01); *B29C 66/8416* (2013.01); *B29C 66/954* (2013.01); *B29C 2063/485* (2013.01); *B29K 2711/14* (2013.01)

(58) Field of Classification Search
USPC .......................................................... 700/159
See application file for complete search history.

(56) References Cited

U.S. PATENT DOCUMENTS

| | | | |
|---|---|---|---|
| 2005/0115375 A1* | 6/2005 | Dick | B27M 1/08 83/358 |
| 2007/0084074 A1* | 4/2007 | Kawai | B23Q 11/08 33/551 |
| 2008/0087359 A1* | 4/2008 | Zurecki | C23C 4/02 148/511 |
| 2008/0152819 A1* | 6/2008 | Gauss | B05B 13/00 427/408 |
| 2009/0120249 A1 | 5/2009 | Gauss et al. | |
| 2010/0269971 A1* | 10/2010 | Schmid | B27D 5/003 156/60 |

FOREIGN PATENT DOCUMENTS

| | | |
|---|---|---|
| DE | 10-2014-221008 | 4/2016 |
| EP | 2243619 A1 | 10/2010 |
| EP | 2253442 | 11/2010 |
| EP | 2792460 | 10/2014 |
| WO | 0200449 A1 | 1/2002 |
| WO | 0214033 A1 | 2/2002 |

* cited by examiner

DEVICE FOR MACHINING AND/OR COATING A WORKPIECE

TECHNICAL FIELD

The invention relates to a device for machining and/or coating a workpiece which preferably consists at least in sections of wood, wood material or synthetic material, with a coating according to the preamble of claim 1.

PRIOR ART

Devices for machining and/or coating a workpiece of the kind mentioned above are widely used, for example, in the furniture industry, in particular in order to profile and/or provide plate-like workpieces with a mostly strip-shaped coating material in the area of its narrow surface. A device of the same type is disclosed, for example, in EP 2 243 619 A1.

The number of variants of both the workpieces to be machined and to be coated as well as the coating material has increased ever more in the last few years and has reached an almost unmanageable level. Thus, the workpieces not only vary, for example, in their measurements and their material composition, but rather also the color and the formation of details such as contours are always being put on the market in new variants. The same applies to the coating material which is also always being offered in new variants, with both visual and technical developments having to be noted here.

During the actual coating process, it is often then the responsibility of the operator to ensure the correct combination of workpiece to be coated and the coating material as well to at times adjust the machining and/or coating device to the operating parameters suitable for this combination. This means that very high demands must be placed on the qualifications of an operator. If the qualifications of the operator are not sufficient, high rejection rates or even interruptions to the operation of the device are to be noted.

DESCRIPTION OF THE INVENTION

It is therefore the object of the invention to provide a device and a method for machining and/or coating a workpiece of the kind mentioned above, which enables a low rejection rate as well as a stable operation with simple operability.

According to the invention, this object is solved by means of an apparatus for machining and/or coating a workpiece according to claim 1 as well as a method for coating a workpiece according to claim 10. Particularly preferred further developments of the invention are given in the dependent claims.

The invention is based on the idea of placing the processing and/or coating operation of the device according to the invention on a clear and consistent basis of information. According to the invention, it is provided for this purpose that the device of the same type has at least one workpiece measuring device which is configured to measure at least one property of the workpiece, in particular a property of the surface of the workpiece to be machined or to be coated.

Preferably, the device according to the invention moreover has a joining device (10) for joining the coating material (4) to a surface (2') of the workpiece (2) and at least one coating material measuring device which is configured to measure at least one property of the coating material.

With the configuration of the device according to the invention it is possible, for example, to relieve the operator with regard to the variety of workpieces to be machined or to be coated and/or the coating materials to be optionally used. In this manner, it can be ensured that erroneous machining and/or coating processes which arise, for example, from undesired combinations of workpiece/tool or workpiece/coating material are avoided or at least reduced. This also results in a clearly more reliable operation of the device according to the invention, since the likelihood of a machine stoppage that is caused by an incompatability, for example, between workpiece/tool or workpiece/coating material is lowered.

Not least, the configuration of the device according to the invention also enables a clearly simplified operability of the device by the operator. In extreme cases, the operator can limit himself to only feeding the respective workpiece to be coated into the device and optionally monitoring the operation of the device.

According to a further development of the invention, it is provided that the controller is configured to control at least one of the joining device, the conveyor and the post-processing device, taking into account the measurement result of the workpiece measuring device and/or the coating material measuring device. In this manner, the number of the required operational interventions of an operator can be minimized and the device according to the invention can, for example, automatically configure itself to a certain operating mode, a certain coating process, etc., according to the measurement result. This results in a particularly simple operation with low rejects and high reliability.

The workpiece measuring device can be configured to measure different measuring quantities. However, according to a further development of the invention, it is provided that the workpiece measuring device is configured to detect a workpiece property which is selected from color, material composition, surface composition, profiling, geometry, in particular thickness and length/thickness ratio and the orientation of the workpiece. These measuring quantities have proven to be especially critical for an error and interference-free machining and/or coating process and therefore a precise knowledge of these measuring quantities considerably contributes with simple operability to reduce the rejection rate and to raise the operational reliability.

For these reasons, it is provided according to a different further development of the invention that at least one coating material measuring device is configured to ascertain a coating material property which is chosen from color, material composition, surface composition and geometry, in particular thickness and/or height of the coating material.

The measuring device itself as part of the invention can be configured in different ways. In view of achieving reliable (less susceptible to faults) and sufficiently more precise measurement results, it is provided, however, according to a further development of the invention that at least one measuring device is selected from a mechanical measuring element, preferably calipers, an optical measuring element, an acoustic measuring element (in particular ultrasound) and an electronic measuring element as well as combinations thereof.

As will be stated in more detail below, the respective measurement results can enter into the machining process and/or coating process in different ways. One particularly critical aspect of the machining process has proved to be determining the machining type of the machining device (for example, determining the milling profile). In order to solve this problem, it is provided according to a further embodiment of the invention that the controller is configured, taking into account at least one coating material property, in particular geometry, to determine a machining type of the machining device.

Alternatively or additionally, it is provided against this background according to a further development of the invention to determine a machining type of the machining device taking into account at least one workpiece property, in particular geometry.

Moreover, it is provided according to a further development of the invention that the controller is configured taking into account at least one workpiece property, in particular color and/or geometry to establish a coating material to be joined by the joining device. This ensures a particularly reliable coordination of the properties of the coating material of the workpiece to be coated, which can be of decisive importance for reducing the rejection rate and achieving interruption-free operation.

A method according to the invention for coating the workpiece is defined in the independent patent claim 11 and enables the same advantages as the device according to the invention.

DETAILED DESCRIPTION OF PREFERRED EMBODIMENTS

Preferred embodiments of the invention will be described in detail below with reference to the figures.

Figure 1:
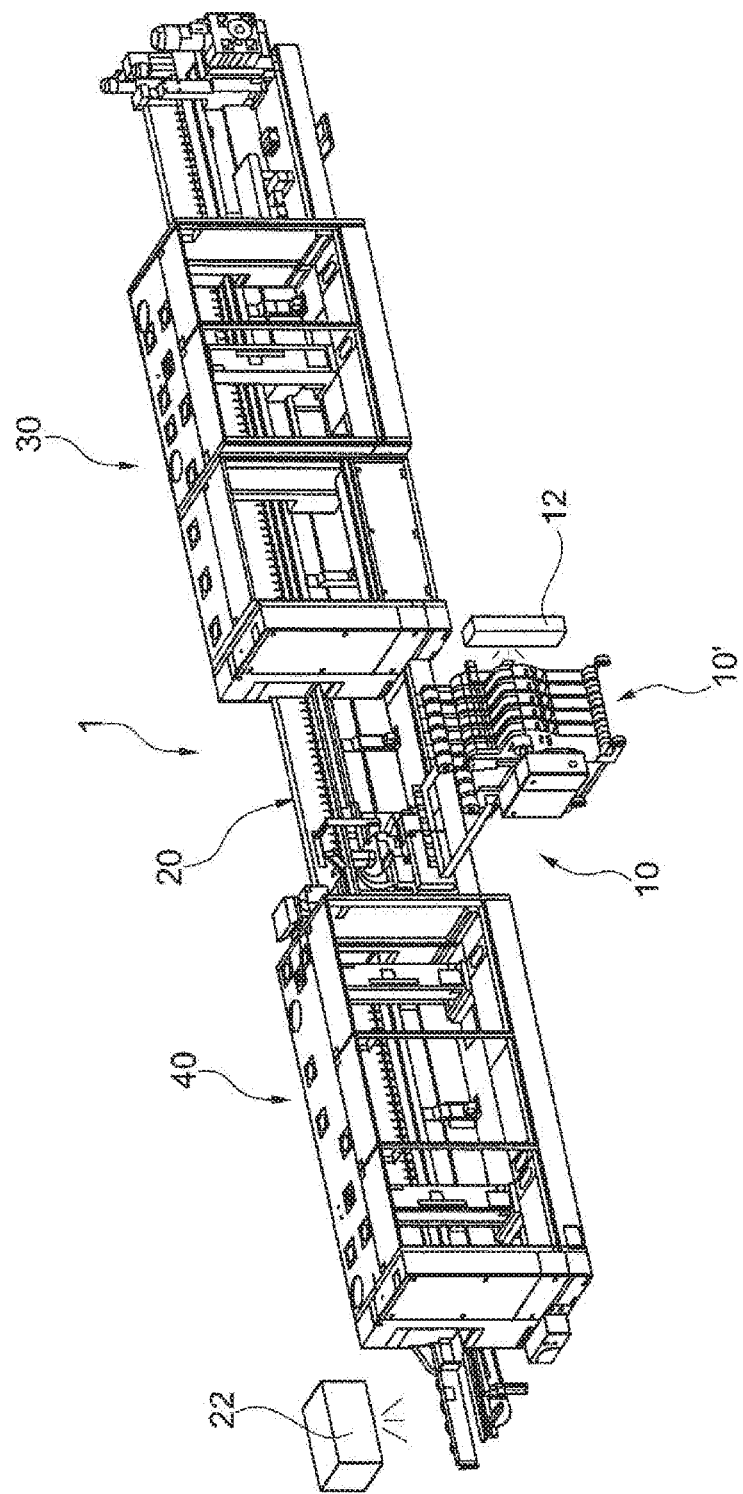
FIG. 1 schematically shows a perspective view of an embodiment of the device according to the invention.
Figure 2:
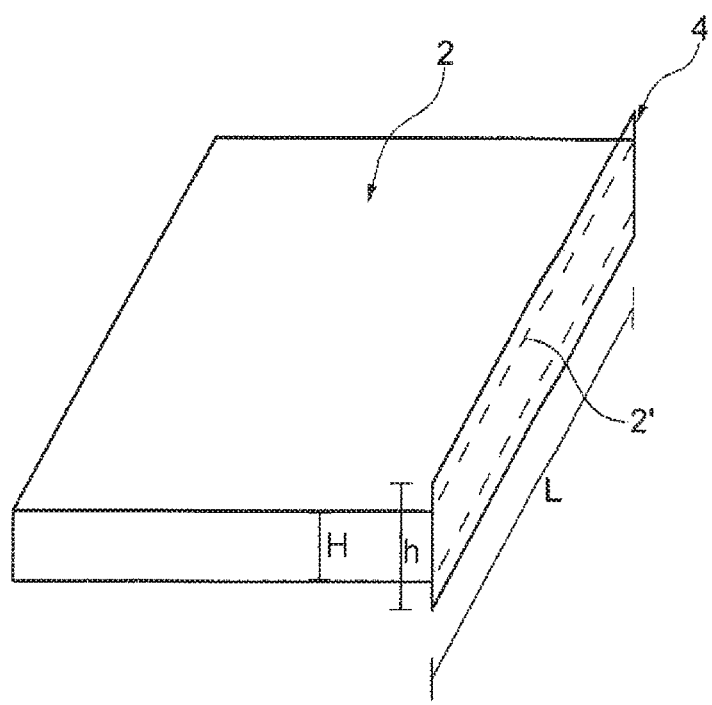
FIG. 2 schematically shows a perspective view of a workpiece coated with a coating material.

A device 1 for machining and coating a workpiece 2 schematically shown in FIG. 2 is schematically shown in FIG. 1 in a perspective view.

In the present embodiment, the workpiece 2 to be coated is a plate-like workpiece which consists, for example, entirely or partially of wood, wood material or synthetic material, such as they are widely used in the furniture industry. However, within the scope of the invention, workpieces having other geometries or being of other materials can also be machined and/or coated.

The coating material 4 to be applied to a surface 2' of the workpiece can, for example, be formed web or strip-shaped and accordingly, for example applied to a wide or narrow surface of the workpiece. The coating material 4 can also thereby consist of different materials including synthetic material, wood, wood material, etc. and also have, for example, a layer structure. The coating material could thereby also be provided with a functional layer by which the coating material 4 is joined to the workpiece 2.

For this purpose, the device 1 schematically shown in FIG. 1 firstly has in the present embodiment a joining device 10 which serves to supply the coating material 4 which is not shown in more detail in FIG. 1 to the surface 2' of the workpiece 2 and to join it thereto. Within the scope of the invention, the joining device 10 can thereby be based on different joining technologies. For example, traditional gluing technologies can be used in which an adhesive (such as, for example, a hotmelt) is applied to the surface of the coating material and/or the workpiece to be joined. As already mentioned above, it is also possible that the coating material 4 is provided with a functional layer and the joining device 10 has an energy source by means of which the functional layer is activated or reactivated in order to be joined on to the surface of the workpiece 2 that is to be coated. Different technologies such as, for example, lasers, LEDs, infrared, hot air, microwaves, ultrasound, etc. can be used as energy sources. In the area of the joining device 10, the coating material 4 can if necessary also be pressed on to the surface 2' of the workpiece 2 that is to be coated and optionally also cooled.

Moreover, the device 1 has a conveyor 20 which is formed in the present embodiment as a pass-through conveyor and serves to convey the workpiece 1 which is not shown in more detail in FIG. 1 in a through-feed direction (from left to right) through the device 1. However, the present invention is not only limited to such pass-through machines, but rather, can also be used with so-called stationary machines in which the workpiece rests during the coating process and the joining device 10 or a different device is moved. Mixed forms of both construction principles are possible within the scope of the invention.

Alternatively or additionally, the device 1 in the present embodiment has a first machining device in the form of a format machining device 40 which is provided upstream of the joining device 10 in the present embodiment. In the format machining device 40, the workpieces 2 can firstly be machined firstly in the area of their surface 2', for example, in that they are machined by means of milling to a desired format or a desired geometry. The workpieces can also be profiled here in the area of their surface 2', for example with a groove or spring etc. Accordingly, the format machining device 40 can have, for example, one or more machining aggregates. However, other machining technologies can be used as well.

Upstream from the joining device 10, the coating device 1 further has in the present embodiment a second machining device in the form of a post-processing device 30 for post-processing the coating material 4 joined to the workpiece 2. Within the scope of the present invention, a typical post-processing process can be, for example, the so-called flush milling, in which the coating material 4 applied to the workpiece 2 with a protrusion is milled flush to an adjoining surface of the workpiece 2. The coating material 4 can also be provided with a desired contour if necessary, for example, with a radius or a phase in the area of the peripheral edge. Accordingly, the post-processing device 30 can have one or more flush milling aggregates and/or shaping aggregates (not shown in FIG. 1) or the like.

Moreover, the device 1 has a workpiece measuring device 22 which in the present embodiment is arranged in the area of the workpiece intake, i.e. at the start of the (pass-through) conveyor 20. The workpiece measuring device 22 is configured to measure one or more properties of the workpiece 2 conveyed by means of the conveyor 20. In particular, these include the color, material composition, surface composition, profiling, geometry and orientation of the workpiece 2. In particular the workpiece parameters illustrated in FIG. 2 are significant for the geometry, i.e. the thickness H and the length L as well the length/thickness ratio resulting therefrom. The reason for this is that these parameters are of particular significance for the later machining and/or coating process.

Depending on the workpiece properties to be measured and the machine requirements (required workpiece throughput, ambient conditions, etc.), the measuring device 22 can be formed by a mechanical measuring element such as, for example, a caliper, however also by optical, acoustic (e.g. ultrasound) and/or electronic measuring elements as well as overall combinations thereof.

Moreover, the device 1 in the present embodiment has a coating material measuring device 12 which, for example, can be arranged in the area of the joining device 10. More particularly, the coating material measuring device 12 in the present embodiment is arranged in the area of a coating material cartridge 10' in which several different coating materials 4 are stored. The coating material magazine 10' can thereby be equipped with different coating materials 4 as required.

The coating material measuring device 12 is configured, for example, to determine the color, material composition, surface composition and geometry of the coating material 4. In particular, the thickness and the height h of the coating material 4 illustrated in FIG. 2 should be thereby determined with regard to the geometry. For this purpose, principally similar measuring elements can be used for the coating material measuring device 12 as with the workpiece measuring device 22, with different combinations—also within a device—being conceivable here as well.

The operation of the device 1 according to the invention is operated for example as follows.

Leftwards in FIG. 1, a workpiece 2 is placed in the intake section of the conveyor 20, for example, by an operator and/or automated. In this area, the properties of the workpiece 2 are measured by means of the workpiece measuring device 22 and forwarded to a controller which is not shown in FIG. 1. Moreover, the coating material measuring device 12 measures the properties of one or more coating materials 4 in the coating material cartridge 10' and forwards this information to the controller as well.

Taking into account these measurement results of the workpiece measuring device 22 and the coating material measuring device 12, the controller controls one or more devices of the device, in particular such as the joining device 10, the conveyor 20, the post-processing device 30 and the format machining device 40.

Thus, the controller can, for example, determine the machining type of the post-processing device 30 on the basis of the thickness of the coating material 4 such that a profile milling is performed with a radius corresponding to the thickness of the coating material 4. Alternatively or additionally, the controller can control the post-processing device 30 such that different post-processing tools and/or milling paths are selected for thin or thick coating materials.

As a further example, the controller can select, for example, a suitable coating material in the first place based on the measured workpiece thickness. Thus, the controller can, for example, select a coating material, the height h of which is sufficiently large in order to coat the narrow surface of a workpiece having the thickness H with sufficient protrusion of the coating material. The controller can also optionally output an error message if there is no coating material in the coating material cartridge 10' which would be suited to the measured thickness of the surface 2' of the workpiece 2 to be coated.

Alternatively or additionally, the controller can also, for example, on the basis of one of the color or surface composition measured by the workpiece measuring device 22, select a suitable coating method, its corresponding properties optionally having been measured by the coating material measuring device 12.

As a further example, the controller can select a suitable machining tool of the format machining device 40 on the basis of the material composition measured by the workpiece measuring device 22. Thus, for example, other machining tools may be useful for MDF workpieces than for large-pored chipboards.

Different types of machining can also result from the thickness of the coating material. Thus, for example, the controller can be configured for thin coating materials to initiate a capping (cutting off) of a projection of the coating material whilst with thick coating materials a form milling can be used in order to remove or mill the projection of the coating material flush.

The workpiece can also be a workpiece which is already provided with a coating material on at least one surface. In such a case, the workpiece measuring device 22 can, for example, also measure the properties of the workpiece including this coating material and, on this basis, control the further machining steps, such as the selection of a suitable coating material or the adjustment of the post-processing steps to the existing geometry, contour, etc. of the coating material already provided on the workpiece.

The device according to the invention has at least one workpiece measuring device and/or at least one coating material measuring device. Moreover, the device according to the invention can also be provided with information about the respective workpiece or coating material by other ways, for example, through data input into the controller, by inputting data or information which is provided on the workpiece or the coating material, etc.

The invention claimed is:

1. A device for machining a workpiece which preferably consists at least in sections of wood, wood material or synthetic material, and/or for coating the workpiece with a coating material, comprising:
    a machining device for machining the workpiece;
    a conveyor for effecting a relative movement between the workpiece and the machining device;
    a controller for controlling the conveyor and the machining device;
    at least one workpiece measuring device which is configured to measure at least one property of the workpiece, in particular a property of a surface of the workpiece to be machined or coated, including at least a geometry of the workpiece;
    a joining device for joining the coating material to a surface of the workpiece; and
    wherein the controller is configured to take into account the least one property of the workpiece to determine the coating material to be joined by the joining device.

2. The device according to claim 1, further comprising:
    at least one coating material measuring device which is configured to measure at least one property of the coating material.

3. The device according to claim 2, wherein the controller is configured to control at least one of the joining device, the conveyor and the post-processing device, taking into account the measurement result of the workpiece measuring device and/or the coating material device.

4. The device according to claim 1, wherein at least one workpiece measuring device is configured to detect a workpiece property which is selected from color, material composition, surface composition, profiling, geometry, in particular thickness and length/thickness ratio, and orientation of the workpiece.

5. The device according to claim 2, wherein at least one coating material measuring device is configured to determine a coating material property which is selected from color, material composition, surface composition, and geometry, in particular thickness and/or height of the coating material.

6. The device according to claim 2, wherein at least one measuring device is selected from a mechanical measuring element, preferably calipers, an optical measuring element, an acoustic measuring element, in particular ultrasound and an electronic measuring element as well as combinations thereof.

7. The device according to claim 1, wherein the controller is configured, taking into account at least one coating material property, in particular geometry, to determine a machining type of the post-processing device.

8. The device according to claim 2, wherein the at least one workpiece property comprises color.

9. The device according to claim 1, wherein the controller is configured, taking into account at least one workpiece property, in particular geometry, to determine a machining type of the post-processing device.

10. The device according to claim 1, wherein the controller is configured to output a warning signal if a workpiece property is not compatible with a coating material property.

11. A method for machining and/or coating a workpiece which preferably consists at least in sections of wood, wood material or synthetic material, with a coating material, using a device according to claim 1, comprising the steps:
   effecting a relative movement between the workpiece and the machining device by means of the conveyor;
   measuring at least one workpiece property by means of the workpiece measuring device and/or at least one coating material property by means of the coating material measuring device; and
   machining the workpiece by means of the machining device.

* * * * *